United States Patent [19]
Knors et al.

[11] Patent Number: 5,985,962
[45] Date of Patent: Nov. 16, 1999

[54] COMPOSITION AND ARTICLE OF IMPROVED COMPRESSION SET

[75] Inventors: Christopher J. Knors; Lawrence A. Monahan, both of Raleigh, N.C.

[73] Assignee: Becton, Dickinson and Company, Franklin Lakes, N.J.

[21] Appl. No.: 08/985,948

[22] Filed: Dec. 5, 1997

[51] Int. Cl.⁶ ...................................................... C08F 8/00
[52] U.S. Cl. ........................... 524/101; 526/248; 604/187
[58] Field of Search ..................... 604/256, 187; 525/101, 193, 288; 526/248, 310, 312; 560/163, 221; 562/439; 564/164

[56] References Cited

U.S. PATENT DOCUMENTS

| | | | |
|---|---|---|---|
| 5,061,247 | 10/1991 | Akaike et al. | |
| 5,142,010 | 8/1992 | Olstein | 526/248 |
| 5,741,858 | 4/1998 | Brann et al. | 525/101 |

FOREIGN PATENT DOCUMENTS

| | | |
|---|---|---|
| 0 702 032 A2 | 3/1996 | European Pat. Off. . |
| WO96/23818 | 8/1996 | WIPO . |

*Primary Examiner*—Corrine McDermott
*Assistant Examiner*—Kent Gring
*Attorney, Agent, or Firm*—Richard E. Brown

[57] ABSTRACT

A thermoset composition comprises a crosslinked blend of a metallocene copolymer of ethylene and an alpha olefin and a block copolymer of styrene and a diene. A medical article is made from the composition. The invention includes a method to make the composition and the article.

10 Claims, 6 Drawing Sheets

COMPOSITION AND ARTICLE OF IMPROVED COMPRESSION SET

FIELD OF THE INVENTION

This invention relates to a polymeric composition and more particularly relates to a medical article of the composition which has excellent compression set and tribological properties.

BACKGROUND

Medical articles are conventionally made by thermoplastic processing of polyolefins or copolymers thereof. Typical polyolefins used are polyethylene, polypropylene or copolymers of these materials with one or more other monomers such as styrene, acrylic or butadiene. A variety of physical properties can be achieved according to the medical application envisioned for the plastic.

One important criterion to be considered when selecting a plastic for medical application is the resistance of the plastic to morphological change during end use, particularly when a component made from the plastic is to be used in a sealing relationship with another component.

If the components also have a sliding relationship, the phenomenon known as stick-slip is often a problem. Thus, it is well known that two stationary plastic surfaces having a sliding relationship often exhibit sufficient resistance to initiation of sliding movement that gradually increased pressure applied to one of the surfaces does not cause movement until a threshold pressure is reached at which point a sudden sliding separation (called breakout in the art) of the surfaces takes place. This situation is commonly referred to as stick-slip or sticktion. Stick-slip is exacerbated by prolonged stationary contact between the surfaces, such as occurs during shelf time. It is particularly troublesome in devices such as syringes, in particular syringes to be used with syringe pumps where ultra slow advancement of the stopper is required, and repeating sequential episodes of stick-slip occur. The term tribology refers to the study of friction, lubrication and wear of surfaces in relative motion.

Natural rubber has been fabricated into articles of low stick-slip which resist morphological change because of low compression set. This material is, however, expensive, difficult to process, and for this reason, SANTOPRENE™ (blend of polypropylene and EPDM (ethylene-propylenediene monomer) has become a material of choice for stoppers intended for medical use. This material, while of excellent compression set, is subject to substantial stick-slip.

It is toward the provision of a composition, and articles made therefrom, having improved tribological properties and reduced morphological change during use that the present invention is addressed.

SUMMARY OF THE INVENTION

As elastomeric blend comprises a styrene-diene block copolymer and a metallocene copolymer of ethylene and an alpha olefin which has been crosslinked to a thermoset composition. (In this disclosure, the mixture of components is referred to as a blend prior to crosslinking and as a composition after crosslinking.) The preferred metallocene copolymer has 3 to 20 carbon atoms, a density of no more than 0.89 g/cc and a durometer hardness of 60–90A. The preferred block copolymer has a durometer hardness of no more than 50A and contains a maximum of 25% by weight of styrene. The blend may be crosslinked by radiation or silane grafting technology so that the composition has a maximum durometer hardness of 60A.

A medical article of the thermoset composition is fabricated by molding the blend into the shape of the article desired and then crosslinking. Alternatively, the molten blend may be crosslinked until thermoset and then, while still molten, may be molded into the article.

The crosslinked thermoset composition and the article made therefrom have excellent permanent compression set and tribological properties and is particularly well suited for various articles for which sealability and slideability are critical, such as syringe barrel and stopper assemblies and tube closures.

DETAILED DESCRIPTION

While this invention is satisfied by embodiments in many different forms, there will herein be described in detail embodiments of the invention with the understanding that the present disclosure is to be considered as exemplary of the principles of the invention and is not intended to limit the invention to the embodiments illustrated and described. The scope of the invention will be measured by the appended claims and their equivalents.

A variety of medical articles may be fabricated from the thermoset composition of the invention. A representative but not exhaustive list of articles contemplated by the invention are needle shields, tube stoppers and closures, gaskets, seals and tubing. A preferred article is a multicompononent article, such as closure for an evacuated tube to be used with a conventional septum and foil moisture barrier, and a 2-piece or 3-piece syringe assembly. The most preferred article is a 3-piece syringe assembly which includes a stopper of the composition, secured to a plunger rod, which forms a sliding seal in a conventional syringe barrel. The invention will be described in detail for the syringe assembly.

Figure 1:
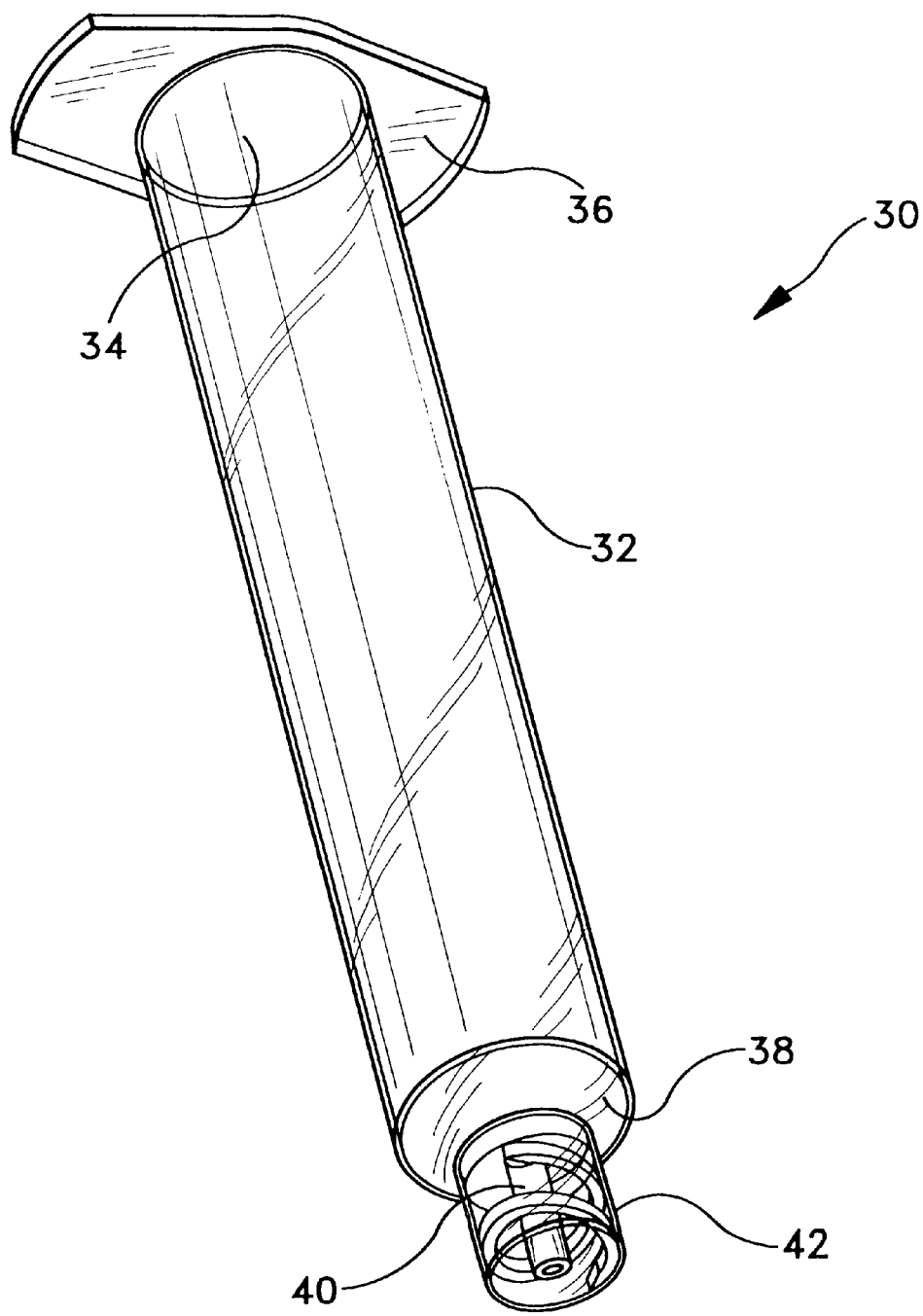
FIG. 1 is a perspective view of a syringe barrel of the invention.

In FIG. 1, syringe barrel 30 has a body portion 32 having an open top end 34 and an optional grasping portion 36. A bottom wall 38 includes a tube portion 40 for delivery of a fluid from body portion 32 when the assembly is in use. Bottom portion 38 is affixed to a conventional hub 42.

Figure 2:
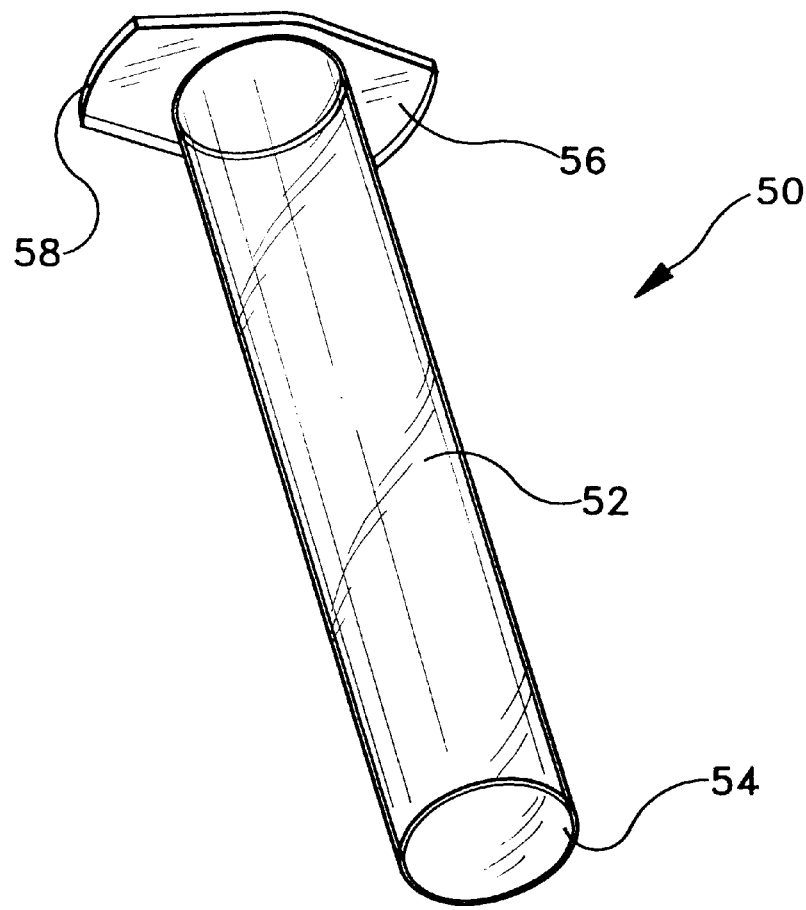
FIGS. 2 and 3 are perspective views of syringe stoppers of the invention.

In FIG. 2, syringe stopper 50 has a body portion 52 and a bottom wall 54. A top wall 56 has an annular projection 58 for advancing and retracting the stopper in the barrel when the assembly is in use. Stopper 50 is dimensioned to have a sliding and sealing relationship to body portion 32 of barrel 30.

Figure 3:
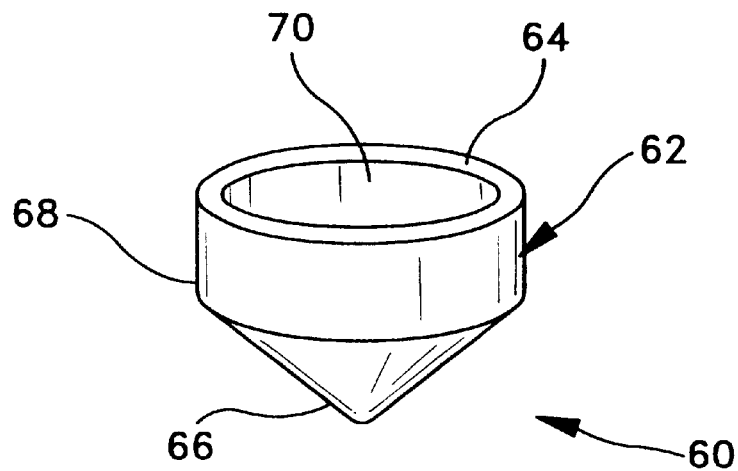

FIG. 3 illustrates a syringe stopper adapted for use with a conventional plunger rod (not shown) in a 3-piece syringe assembly. A stopper 60 has a body portion 62, a top wall 64, a bottom wall 66 and a side wall 68. Body portion 62 has a recess 70 into which the plunger rod is securely mounted. The rod-stopper assembly is inserted into the barrel so that the stopper slides sealingly against the barrel inside wall.

Although not shown in the drawings, a conventional lubricant, such as polydimethyl siloxane, may be positioned between the barrel and stopper.

The thermoset composition of the invention having low compression set, excellent stress and strain relaxation and very low stick-slip comprises at least two polymeric components which have been blended and then crosslinked.

The first component of the blend may be a copolymer which includes ethylene and an alpha olefin having from 3 to 20, preferably 4 to 8 carbon atoms. Preferred copolymers are members of the class known in the art as plastomers, i.e., polyolefin copolymers made by polymerizing olefins in the presence of a metallocene catalyst. The most preferred plastomers have a durometer hardness of 60–90A, a density of 0.85 to 0.9, preferably about 0.89 g/cc, a molecular weight distribution of 2 to 5, preferably about 3 and a melt flow index (MFI) of 0.1 to 100, preferably about 1 to 50 dg/10 min. Such products are commercially available from Aldrich Chemical Co., from Exxon under the trade name EXACT™ and from Dow under the trade name ENGAGE™.

The second component of the blend may be a diblock or triblock copolymer of styrene and a diene having 10–25% by weight of styrene and a durometer hardness of 25–50A. (Hardness up to 70A may be used by adding up to 20% by weight of a conventional plasticizer to reduce the durometer to 50A or less)Exemplary of suitable block copolymers are, for example, styrene-butadiene-styrene, styrene-isoprene-styrene, styrene-butadiene, and styrene-isoprene. Styrene-diene copolymers are commercially available from Shell and Dexco under the trade names KRATON-D™ and VECTOR™ respectively.

The blend of plastomer and styrene block copolymer may contain from 5 to 50, preferably about 20–40 parts by weight of the styrene block copolymer. The composition may thus contain 0.5 to 12.5% by weight of styrene. Additional conventional components may be added to the blend in order to provide other desirable properties to the composition. For example, fillers, clarifying agents, coloring agents, radiation stabilizers, antistatic materials, wetting agents, oils to reduce hardness, foaming agents and the like may be added in suitable quantities. One skilled in the art of polymer compositions is well versed in such additives and no further description of these materials is needed for a complete understanding of the invention.

Because it is thermoplastic, the blend described above may be melt processed to give a shaped medical article. Processing may be performed by any suitable procedure such as injection or compression molding. The shaped article may then be treated with radiation to crosslink the components of the blend and thereby convert the blend to a thermoset composition. Light, gamma or electron beam radiation may be used at any dose sufficient to introduce the desired compression set. For radiation crosslinking, a crosslinking accelerator may be included in the blend. Exemplary of such materials are triallyl cyanurate, triallyl isocyanurate, cic 1,2-polybutadiene resin, low molecular weight ethylene-propylenediene resins, mono-,di-,tri,- and tetra-allyl acrylates and mixtures thereof. These well known materials may be used in about 2–10% by weight.

Crosslinking may also be accomplished by conventional silane grafting technology. For this embodiment of the invention the copolymers of the blend may first be grafted to silane groups. Silane crosslinking reagents are sold by HULS AG, Somerset, N.J. under the trade name DYNASYLAN™. While not wishing to be limited thereby, a preferred crosslinking agent is vinyl trimethoxysilane which grafts onto a polyolefin chain under catalysis by peroxide. Preferably, about 0.1 to 10% by weight, most preferably about 2–10%, of reactive silane groups are grafted onto the polyolefin. The blend after grafting may have a density of 0.85 to 0.95 most preferably 0.85–0.87 g/cc, a melt flow index of 0.1 to 1000, preferably 1 to 100 dg/10 min, a durometer hardness of 40–7A and a molecular weight distribution of 2–5, preferably about 3. The silane-grafted blend may then be processed into the shaped article as above and exposed to moisture whereby the grafted silane groups react to crosslink the polymer molecules through siloxane groups. The shaped article may be immersed in a water bath at any temperature from 1 to 100° C. for about 1 minute to 16 hours, or preferably may simply be exposed to steam or an atmosphere of high water vapor content until crosslinking is complete.

It is believed that, after crosslinking, the composition of the article contains block of crosslinked styrene-diene, blocks of crosslinked plastomer, and blocks of plastomer crosslinked to blocks of styrene-diene.

The crosslinked composition or article has a durometer hardness of 40–60, preferably about 50–55A. As is usual for crosslinked materials, the composition after crosslinking is thermoset and cannot be remelted for processing without decomposition.

In an alternate embodiment of the invention, the blend may be crosslinked and shaped into the article in a single step. The molten blend may be irradiated for crosslinking, or the molten silane-grafted blend may be crosslinked with moisture and, while still molten, may be introduced to a mold for shaping. On cooling, the crosslinked and shaped composition hardens into the thermoset article of the invention.

The article may be sterilized by any convenient procedure, such as by ethylene oxide, gamma or electron-beam radiation or autoclaving.

The crosslinked composition of the invention has greatly improved compression set compared to prior art compositions. In the present invention, the term compression set is used in its conventional sense as a measure of the permanent deformation of a material which has been stressed, i.e. the percentage of compressive deformation not recovered on removal of the stress. Thus, a compression set of 0% indicates that all deformation is recovered and no permanent morphological change has occurred whereas a compression set of 100% indicates no recovery upon removal of the stress.

Prediction of the sealing capacity of a rubber over time, as, for example, between a syringe barrel and mating stopper, has conventionally been performed by measurement of the compression set at constant strain. In this test (ASTM D395), a standard specimen of known thickness is compressed an arbitrary percentage (commonly 25%) of its thickness and retained in that state for a given time at a specified temperature in a specified environment. At the end of the test period, the compressive stress is removed and the thickness is measured. Sealing capacity increases with decreasing set, i.e., sealing is greater with greater recovery.

Compression set may also be used to measure the reliability of a seal between a rubber stopper compressed into a tube. In this case, poor recovery (high compression set) would lead to stopper fatigue and possible loss of seal. In accordance with the invention, it has been found that thermoset compositions having a compression set of 70% or lower, preferably 20–50%, most preferably 0–30% are suitable for fabrication of the medical article of the invention.

The percent compression set for several compositions of the invention is given in TABLE I. For comparison purposes, Table I also includes several thermoset compositions (nos. 3, 5, 7, 9 and 11) which meet the chemical limitations for the claimed composition but which do not meet the compression set limitations. TABLE II gives data for several prior art compositions. The ratios given in parentheses are in weight percent. In the Tables, the following abbreviations are used.

EB—ethylene-butylene copolymer
EO—ethylene-octene copolymer
SIS—styrene-isoprene-styrene block copolymer
a—EXACT 5008
b—KRATON 1320X
c—EXACT 4006
d—KRATON 1107P
e—ENGAGE 8400
f—ENGAGE 8180
g—VECTOR 4113

TABLE I

| Composition | Durometer | Crosslinking | Set* % |
|---|---|---|---|
| 1. $EB^a$—$SIS^b$ (80/20) | 50 | 20 mrad | 68 |
| 2. " | 55 | 50 | 21 |
| 3. $EB^c$—$SIS^b$ (60/40) | 54 | 20 | 85 |
| 4. " | 57 | 50 | 35 |
| 5. $EB^c$—$SIS^d$ (60/40) | 53 | 20 | 87 |
| 6. " | 58 | 50 | 27 |
| 7. $EO^e$—$SIS^b$ (60/40) | 52 | 20 | 97 |
| 8. " | 55 | 50 | 58 |
| 9. $EO^e$—$SIS^d$ (60/40) | 51 | 20 | 99 |
| 10. " | 49 | 50 | 31 |
| 11. $EO^f$—$SIS^d$ (80/20) | 60 | 25 | 80 |
| 12. $EO^a$—$SIS^g$ (80/20) | 50 | Silane | 25 |

TABLE II

| Composition | Durometer | Radiation (mrad) | Set* % |
|---|---|---|---|
| 13. $EB^a$ (100) | 61 | 0 | 100 |
| 14. " | 61 | 25 | 100 |
| 15. $EB^c$ (100) | 79 | 0 | 100 |
| 16. " | 79 | 25 | 100 |
| 17. $EO^d$ (100) | 72 | 0 | 100 |
| 18. " | 72 | 25 | 100 |
| 19. $EO^f$ (100) | 66 | 0 | 100 |
| 20. " | 60 | 25 | 100 |
| 21. $EB^a$—$SIS^b$ (80/20) | 50 | 0 | 100 |
| 22. $EB^c$—$SIS^b$ (60/40) | 55 | 0 | 100 |
| 23. $EB^c$—$SIS^d$ (60/40) | 55 | 0 | 100 |
| 24. $EO^e$—$SIS^b$ (60/40) | 52 | 0 | 100 |
| 25. $EO^e$—$SIS^d$ (60/40) | 52 | 0 | 100 |
| 26. $EO^f$—$SIS^d$ (60/40) | 60 | 0 | 100 |
| 27. SANTOPRENE** (100) | 55 | 0 | 20 |
| 28. $SIS^d$ (100) | 37 | 0 | 100 |
| 29. $SIS^b$ (100) | 32 | 0 | 100 |

*ASTM D395; 131° C., 0.25 hr, 30 min cooling
**Advanced Elastomer Systems, Akron, OH It is readily seen that the crosslinked thermoset compositions of the invention listed in Table I show a compression set as low as 21%. In contrast, Table II shows a variety of prior art thermoplastic elastomeric compositions to have no recovery after removal of the stress.

As applied to the medical articles of this invention, the improved set of the crosslinked composition provides the advantage of minimal change in morphology of the shaped medical article. For example, in a syringe assembly, a syringe stopper of the composition in a sliding and sealing relationship with a conventional syringe barrel does not undergo any substantial size or shape change during use which would compromise the seal. In the same way, the seal between a tube stopper of the composition and a conventional elastomeric septum used therewith is not compromised during use.

In addition to having improved compression set, the composition of the invention provides excellent tribological properties to a multicomponent article. Tribology may be tested by the procedure given below. It has been found that a syringe stopper fabricated from the composition of the invention slides smoothly in a syringe barrel of a different plastic with substantially no stick-slip.

EXAMPLE 1

SYNTHESIS OF SILANE CROSSLINKED COMPOSITION

A blend of 20% by weight of styrene-isoprene-styrene triblock polymer (VECTOR 4113, 15% styrene, durometer 35A) and 80% by weight of plastomer (EXACT 5008) was mixed with vinyl trimethoxysilane and peroxide. The resulting mixture was extruded and moisture cured to give composition 12 of Table I.

EXAMPLE 2

PROCEDURE FOR MEASUREMENT OF STICK-SLIP

Figure 4:
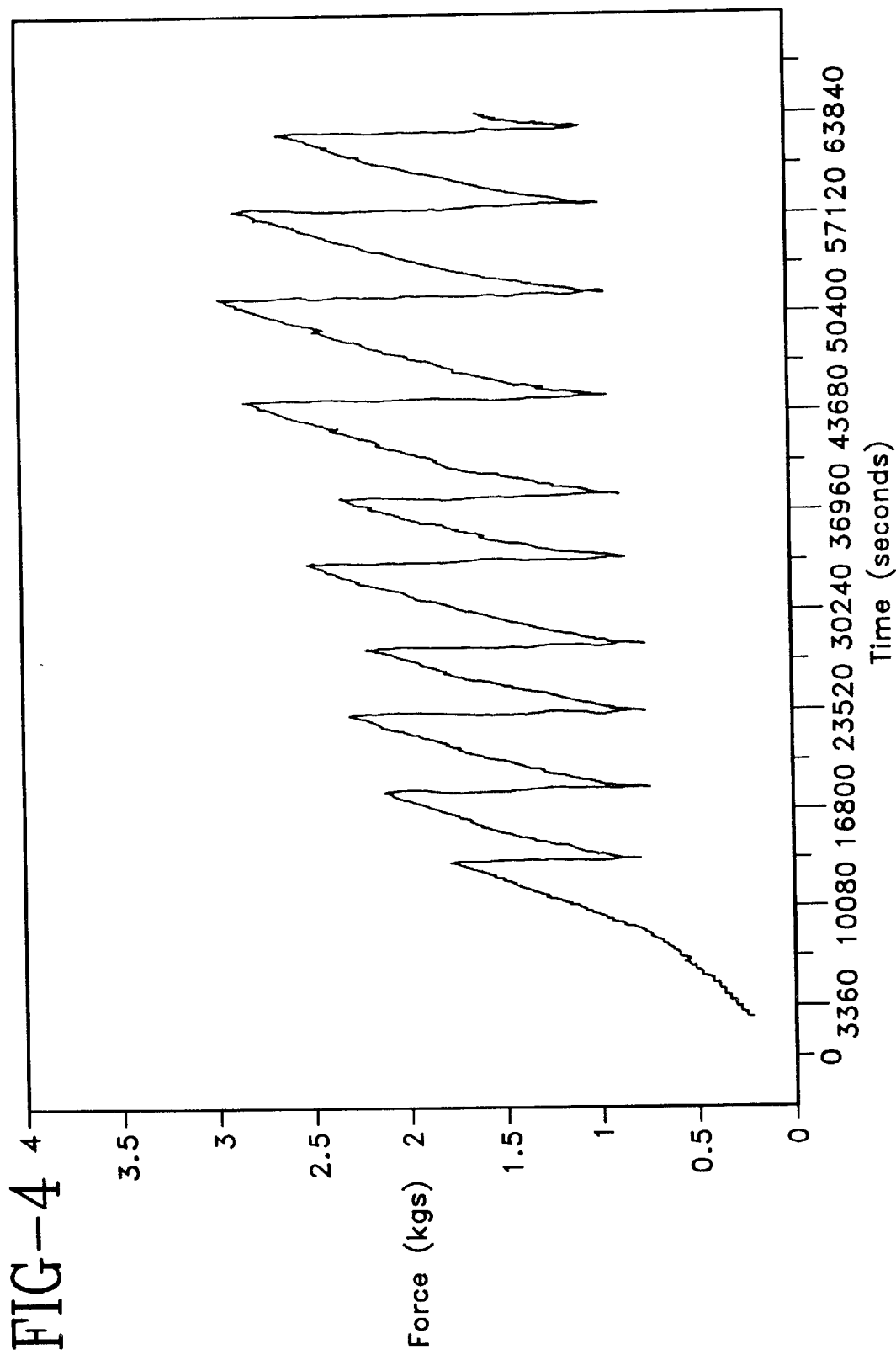
FIGS. 4, 5, 6 and 7 are plots illustrating stick-slip for a syringe assembly including the barrel of FIG. 1 and stoppers made of a conventional thermoplastic elastomer (TPE), natural rubber, and radiation and silane crosslinked compositions of the invention respectively.
Figure 5:
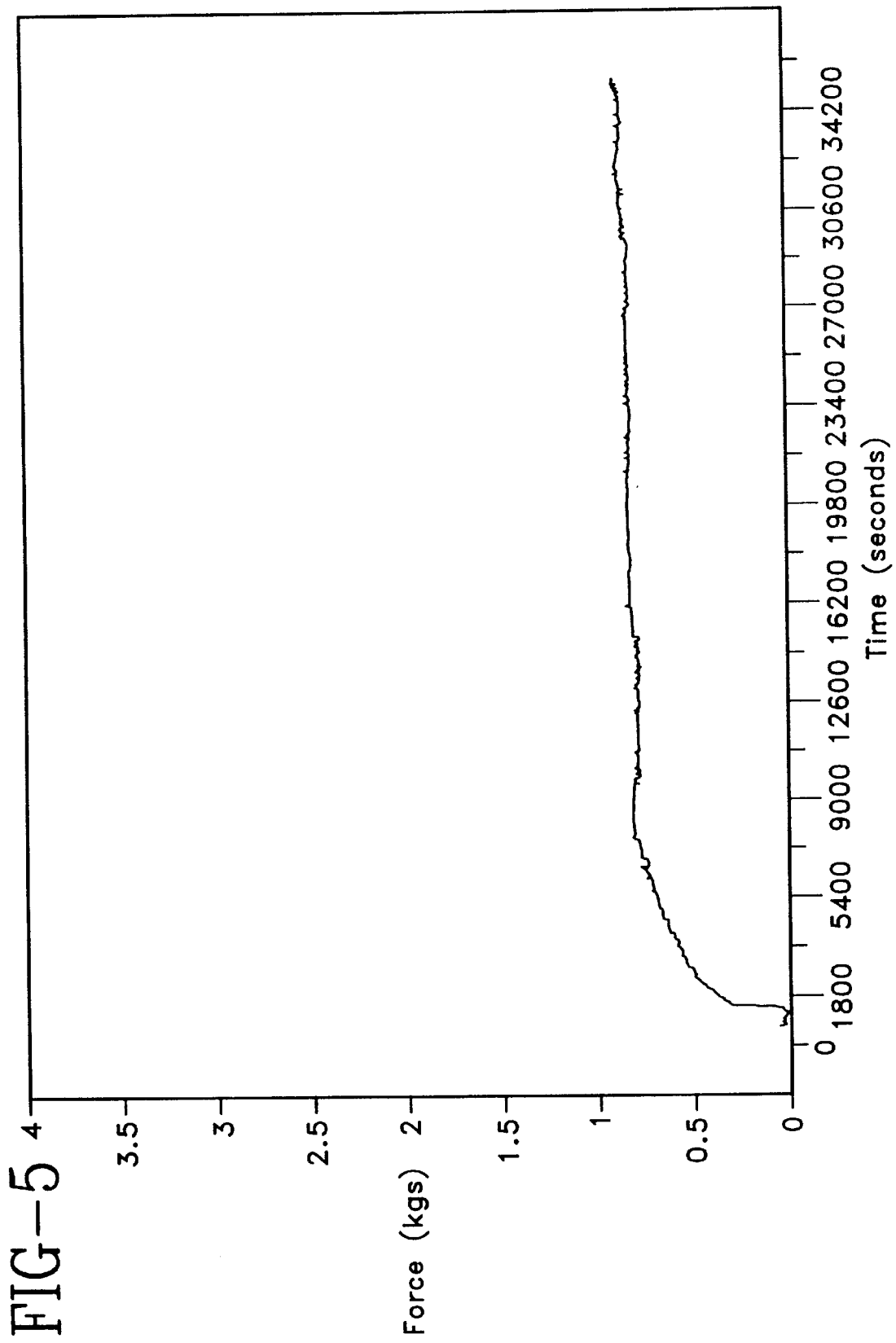
Figure 6:
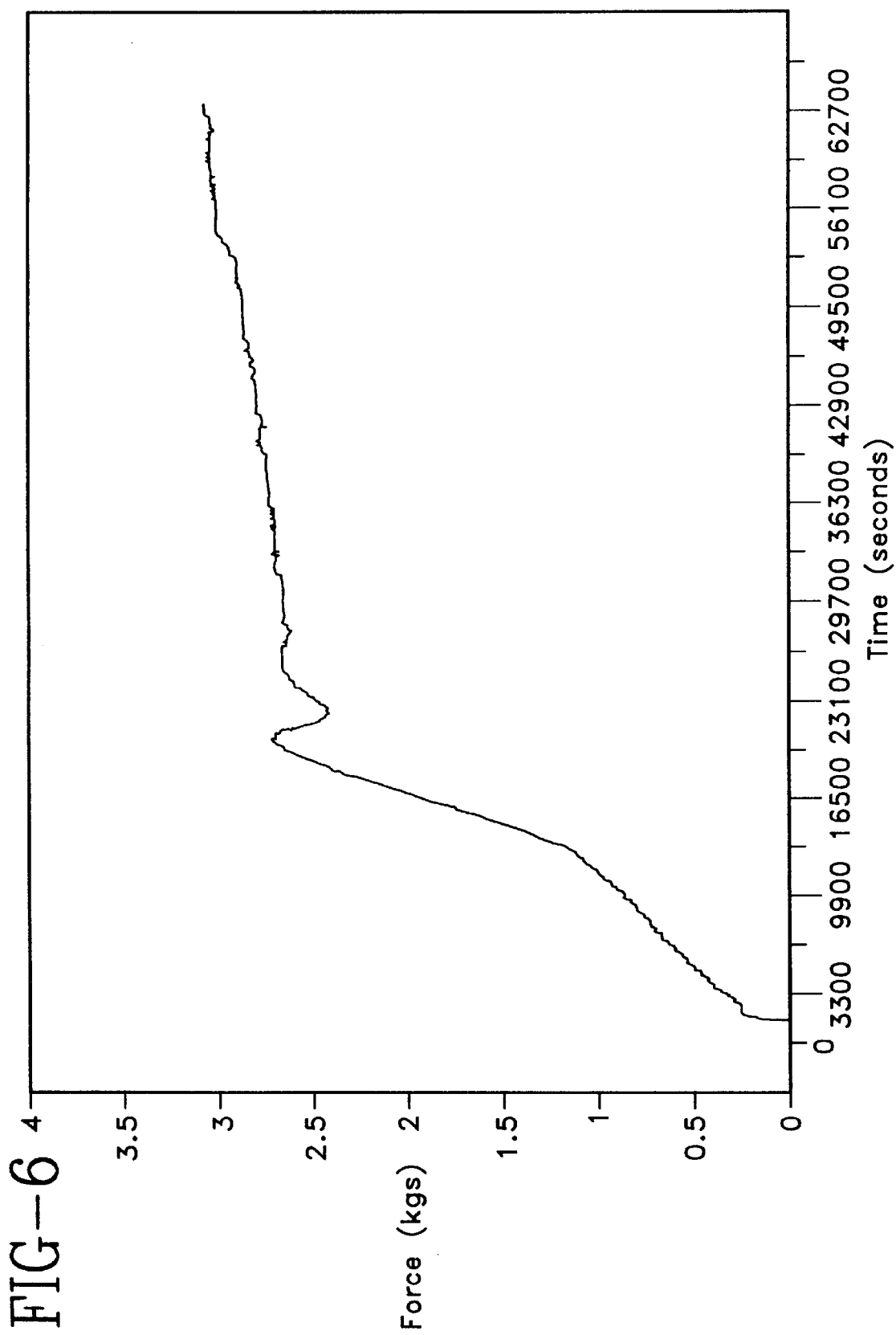
Figure 7:
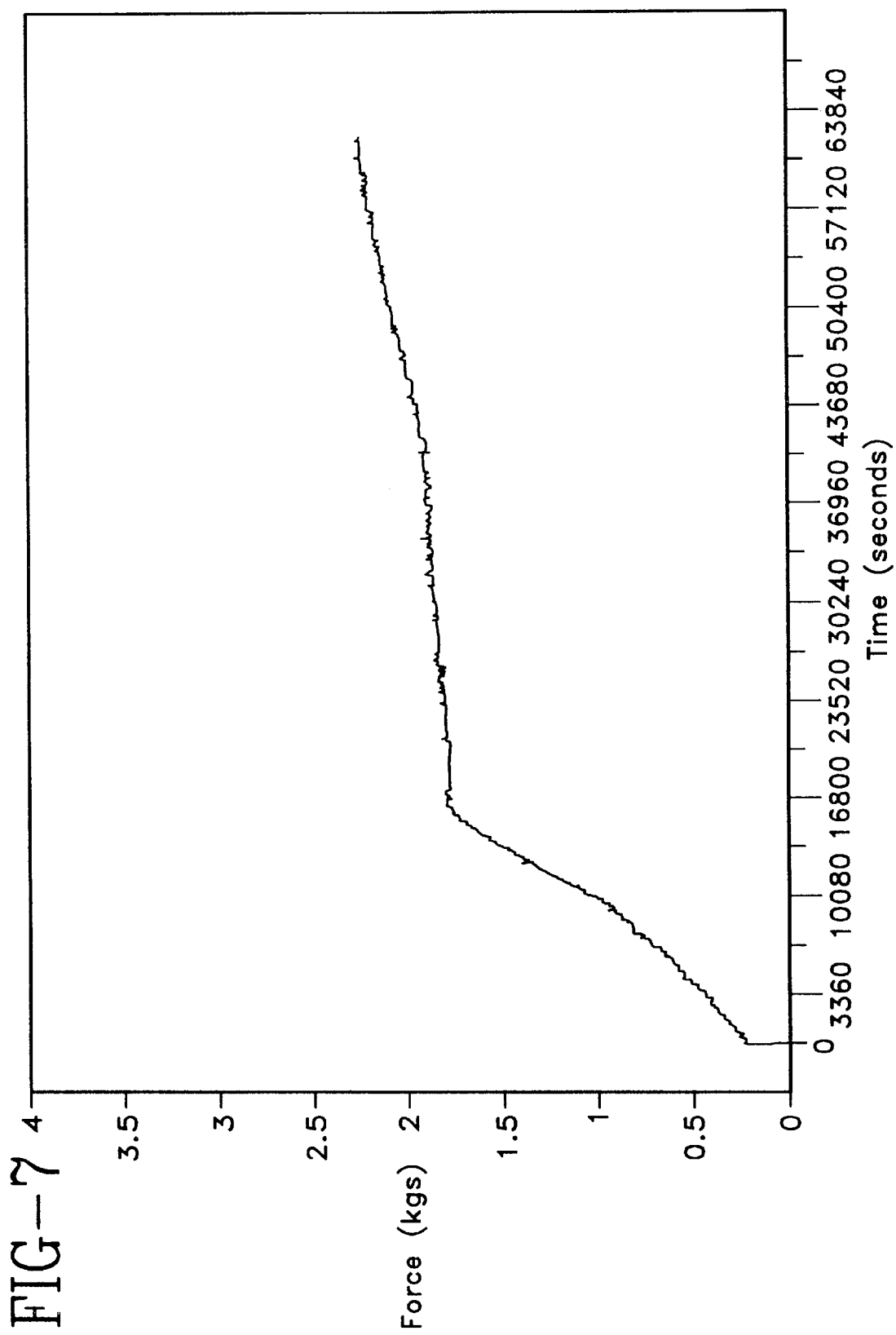

A 60 ml syringe having a barrel and stopper was mounted onto a syringe pump fitted with a force transducer which grips the thumbpress of the stopper. The transducer was calibrated to the "0" line on the monitor of a computerized data acquisition system and the syringe barrel filled with deionized water and purged of air bubbles. The pump was set for the slowest possible speed (0.1ml/hr) to give maximum stick-slip. Force data against time was collected at the monitor. FIG. 4 shows substantial stick-slip for a SANTOPRENE stopper. FIGS. 5, 6 and 7 show relatively little stick-slip for a natural rubber stopper and for two stoppers of the invention made of radiation and silane crosslinked compositions respectively.

What is claimed is:

1. An elastomeric thermoset composition comprising a blend of:
   a) a metallocene copolymer of ethylene and an alpha olefin of 3–20 carbon atoms; and
   b) a block copolymer of styrene and a diene having 10–25% by weight of styrene, said blend having about 0.5 to 12.5% by weight of styrene and having been crosslinked, said composition having a compression set of 70% or less.

2. The composition of claim 1 which has been crosslinked by radiation.

3. The composition of claim 1 wherein said blend selected further comprises a silane group grafted to at least one of said metallocene and block copolymers.

4. The composition of claim 3 which has been crosslinked by moisture.

5. The composition of claim 1 which has a durometer hardness of 40–60A.

6. A shaped medical article comprising the composition of claim 1.

7. The article of claim 6 having a first component of said composition and a second component of different plastic, said first and second components being slidably engaged with substantially no stick-slip.

8. A syringe assembly comprising:
a) a syringe barrel;
b) a plunger rod positioned in said barrel; and
c) a syringe stopper mounted on said rod and slidably engaged with said barrel, said stopper comprising the composition of claim 1.

9. A process for manufacture of a medical article comprising molding and crosslinking a melt of the blend of claim 1 to give a shaped medical article.

10. An elastomeric thermoset composition comprising a blend of a metallocene copolymer of ethylene and an alpha olefin having 4 to 8 carbon atoms and a styrene-isoprene block copolymer, said metallocene copolymer having a density of no more than 0.89 g/cc, a melt flow index of 1 to 50 dg/10 min and a molecular weight distribution of 3 or less, said block copolymer having no more than 25% by weight styrene content and a durometer hardness of no more than 50A, said blend having about 0.5 to 12.5% by weight of styrene and having been cross-linked, said composition having a durometer hardness of 50–55A and a compression set of 50% or less.

* * * * *